US012385266B1

(12) United States Patent
De Bard

(10) Patent No.: US 12,385,266 B1
(45) Date of Patent: Aug. 12, 2025

(54) TECHNIQUES FOR SCREEN AND SPLINE REPLACEMENT

(71) Applicant: Adam De Bard, Merced, CA (US)

(72) Inventor: Adam De Bard, Merced, CA (US)

( * ) Notice: Subject to any disclaimer, the term of this patent is extended or adjusted under 35 U.S.C. 154(b) by 0 days.

(21) Appl. No.: 18/936,862

(22) Filed: Nov. 4, 2024

(51) Int. Cl.
*B25B 27/00* (2006.01)
*E04G 23/02* (2006.01)
*E06B 9/52* (2006.01)

(52) U.S. Cl.
CPC .......... *E04G 23/02* (2013.01); *B25B 27/0092* (2013.01); *E06B 9/52* (2013.01); *E06B 2009/527* (2013.01); *Y10T 29/53943* (2015.01)

(58) Field of Classification Search
CPC ..... E04G 23/02; E06B 9/52; E06B 2009/527; B25B 27/0092; Y10T 29/53657; Y10T 29/53943; E04F 21/0038
See application file for complete search history.

(56) References Cited

U.S. PATENT DOCUMENTS 1,348,639 A * 8/1920 Grundmann .......... E04F 21/161 15/235.3
1,473,143 A * 11/1923 Dean ...................... A01B 15/16 15/236.01
D144,225 S * 3/1946 Teague ........................... D7/693
4,241,487 A * 12/1980 Kraver ................ E04F 21/0038 140/109
4,574,479 A * 3/1986 Gramann .................. B26B 3/00 7/113
4,730,378 A * 3/1988 Sweeny .............. E04F 21/0038 140/109
D312,376 S * 11/1990 Sweeny ........................... D8/98
D330,665 S * 11/1992 Neuendorf ..................... D7/693
D600,512 S * 9/2009 Weber ............................ D7/693
11,518,053 B2 * 12/2022 Cauley, Jr. ............. B25G 1/102
2010/0122443 A1 * 5/2010 Ward .................. B25B 27/0092 29/278

* cited by examiner

*Primary Examiner* — Brent W Herring
(74) *Attorney, Agent, or Firm* — SALIWANCHIK, LLOYD & EISENSCHENK

(57) ABSTRACT

Embodiments described herein relate to techniques for spline and screen replacement. An example tool can include a handle. The tool can further include a body connected to the handle, the body including a curved first edge having a first tip at a first end, the first tip defined by the curved first edge and a second edge of the body, a third edge extending from the second edge to the handle, a second tip at a second end of the body, the second tip defined by the first edge and a fourth edge, and a fifth edge extending from the fourth edge to the handle.

18 Claims, 6 Drawing Sheets

TECHNIQUES FOR SCREEN AND SPLINE REPLACEMENT

BACKGROUND

A window can include a screen and a spline for assisting with ventilation and keeping insects out of an enclosure, such as a home or office. A window screen can allow air to pass through a window frame while preventing insects from entering the enclosure. A spline can include a strip of flexible material that can be used to secure the window screen into a groove of the window frame. It can be desirable for improved techniques for replacement of a window screen and spline for a window frame.

DETAILED DESCRIPTION

Figure 1:
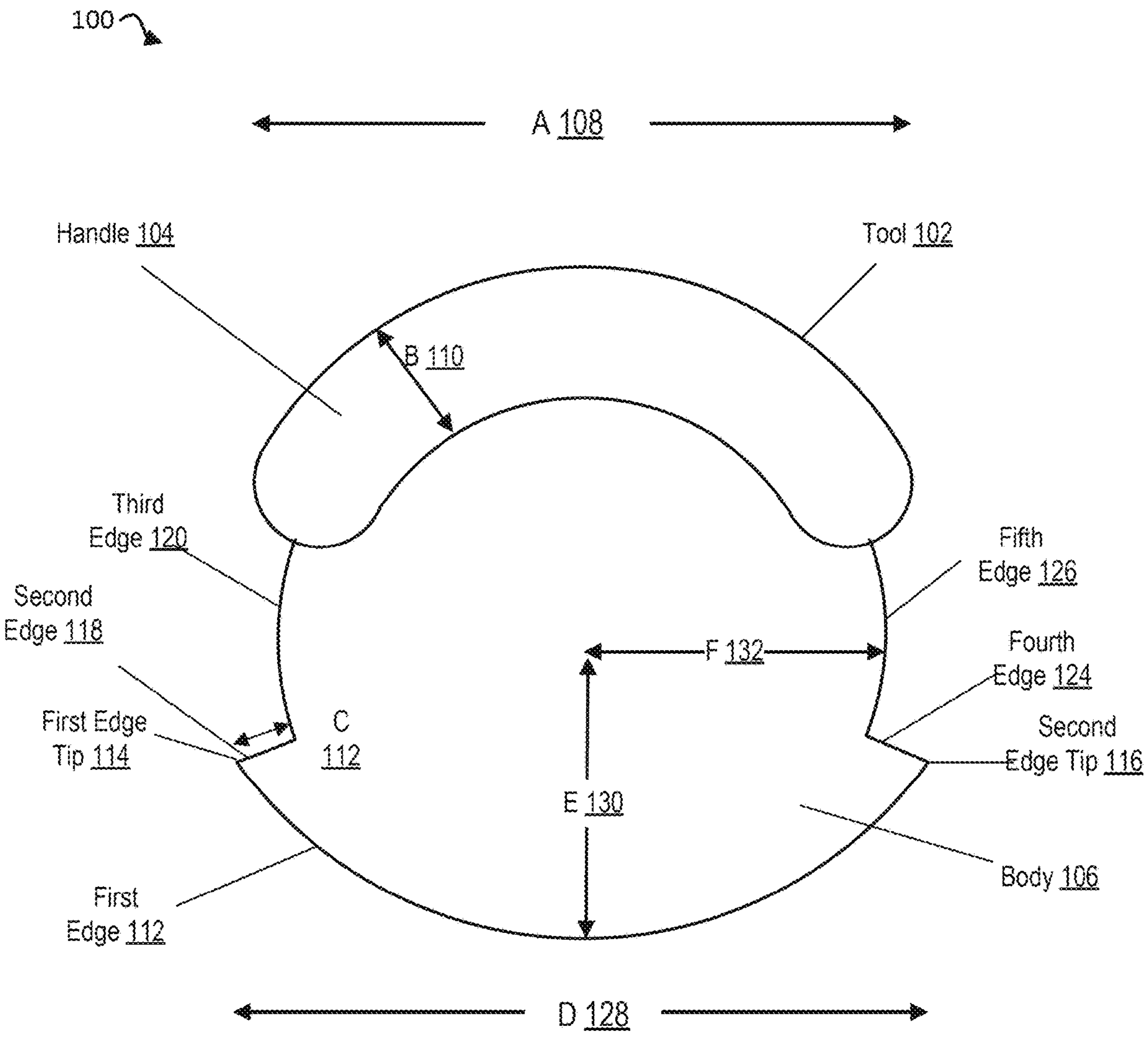
FIG. 1 is an illustration of an example screen and spline tool, according to one or more embodiments.

The following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

From time to time, a window screen and/or a spline may need to be replaced. The general replacement process can include removing the spline from a window frame groove. The spline can be a flexible material, such as rubber vinyl, and the like. It can be important to carefully remove the spline as not to damage the window frame. Once the spline has been removed, the window screen can be removed.

The window frame can be cleaned to remove any debris, and a new window screen can be placed on the window, where the border of the window screen can overlap a groove of the window frame. The spline can be placed on top of the window screen above the groove. The spline can then be pressed into the groove to secure the window screen onto the window frame. For example, the groove can have a shape (e.g., rectangular, circular, or other shape), and the spline can be laid out on top of the window screen to have a rectangular shape that corresponds to the groove's shape. Beginning at one point, the spline can be pressed down into the groove, and continue to be pressed down into the groove along groove until the entire spline is pressed down into the groove to secure the window screen.

In many instances, a conventional spline roller tool can be used to process the spline into the groove. Many conventional spline roller tools resemble pizza cutting rollers with a movable roller. One issues for the conventional spline roller tool is that motion required to press the conventional spline roller tool into the spline can require positioning the tool at an odd angle. Furthermore, at this odd angle, the rolling motion of the tool can be difficult to control, and the tool can easily roll out of the groove. Another issue can be that the conventional spline roller cannot adequately press a spline into a corner based on the amount of available space in a groove corner.

The embodiments herein address the above-referenced issues by providing a techniques for pressing a spline into the groove of a window frame to secure a window screen. In some embodiments, a screen and spline replacement tool can include a hand-held tool with a handle connected to a body. The body can include an edge that is generally curved. The curved edge can include two edge tips at each end of the curve. The edge provides a contact area for pressing down on the spline, and the edge tips can be used to press the spline at the corners. Furthermore, the herein described tool can press the spline into the groove using a rocking motion, rather than the roller motion of the conventional spline roller tool.

Figure 2:
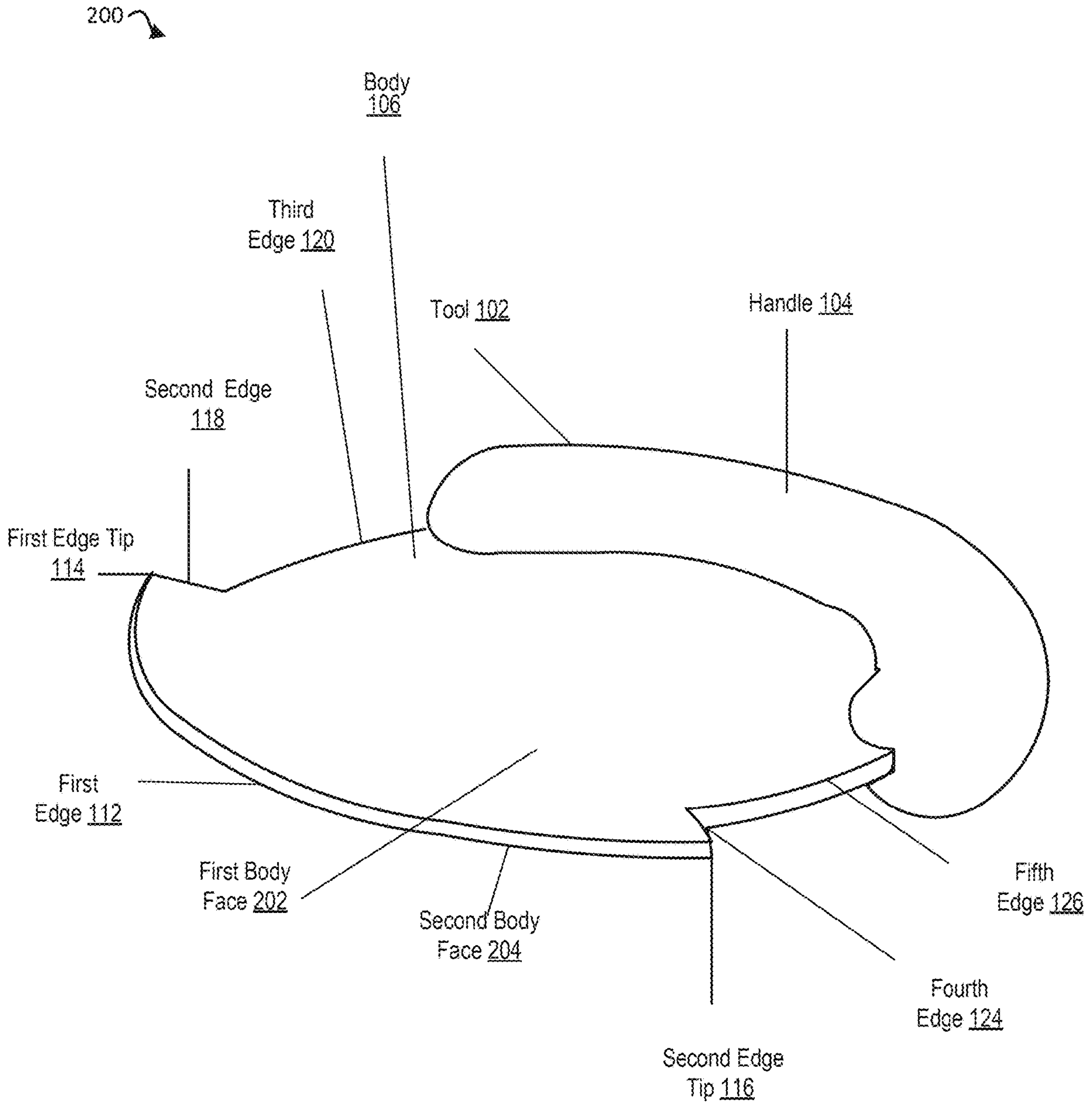
FIG. 2 is an illustration of an example screen and spline tool, according to one or more embodiments.
Figure 3:
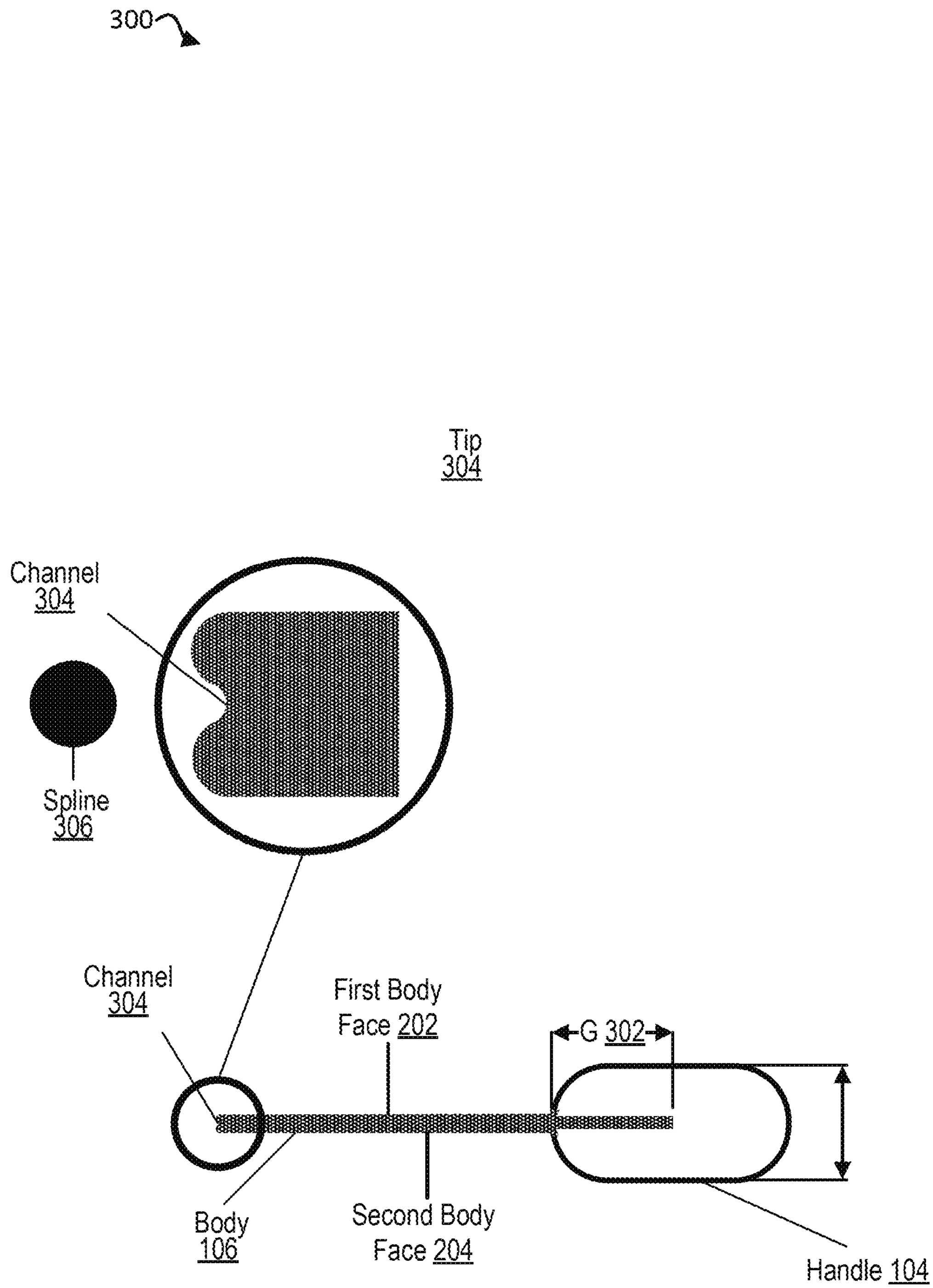
FIG. 3 is a cross-sectional illustration of an example screen and spline tool, according to one or more embodiments.

FIGS. 1, 2, and 3 are provided to illustrate an example tool to be used for window screen replacement from different viewing angles.

FIG. 1 is an illustration 100 of an example screen and spline tool, according to one or more embodiments. The tool 102 can include a handle 104 and a body 106 to be used for pressing a spline into a groove of a window frame. The handle 104 can be used to grip the tool 102 for transporting the tool 102 or for using the tool 102 for spline and screen replacement. The handle 104 can be an ergonomically designed handle to be used to replace a window screen. The handle 104 can have a generally cylindrical shape to permit the handle 104 to be gripped. In some embodiments, the handle 104 can be fabricated to have length A 108. For example, in some embodiments, the handle 104 can have length A 108 of five and one sixteenth inches (e.g., 5 and 1/16 of an inch), or within a threshold range (e.g., within one sixteenth inches) of this value. The handle can also have a width B 110. In some instances, the width B 110 can be one inch (1 inch) or within the threshold range of this value. The body 104 can be fabricated from various materials, such as plastics, bioplastics, rubber, and other appropriate materials. It should be appreciated that although the illustrated handle 104 has a curved form, one having ordinary skill in the art can contemplate various other forms (e.g., a straight handle, a rigidly angled handle, or other handle form) that can be connected to the body 106.

The body 106 can be connected to the handle 104 and be used for spline and screen replacement. The body 106 can have a flat face or generally flat face. As illustrated, the body 106 can have a first edge 112 for pressing down on a spline into a groove of a window frame. As illustrated, the first edge 112 can be curved and the entire curvature can make contact with a spline. The curvature can enable the tool 102 to be used with a rocking motion indicated above. The rocking motion is described with more detail with respect to FIG. 4. In general, the tool 102 can make contact with a spline and be moved in a clockwise and counterclockwise motion as it is pressed into the spline. The width of the first edge 112 can be configured to permit the body 102 to be inserted into a groove of a window frame. For example, if the width of a groove is one half of an inch, the width of the first edge 113 can be less than one half of an inch.

As illustrated, each end of the first edge 112 can have an edge tip. As illustrated, one end can include a first edge tip 114 and an opposite end can include a second edge tip 116.

As illustrated, the edge tips can be angular to form a pointed tip. In some embodiments, the angle can be an acute angle to permit each edge tip to be pressed into an angled groove of a window frame. For example, a second edge 118 and the first edge 112 can be joined to form an acute angle. In some embodiments, the second edge 118 and the first edge 112 can be joined to form a right angle. In yet other embodiments, the second edge 118 and the first edge 112 can be joined to form an obtuse angle. The second edge 118 can be fabricated to have a length C 122. In some embodiments, the length C 122 can be one half of an inch (e.g., ½ of an inch) or within the threshold range of this value. Although illustrated as an angle, in some embodiments, the edge tips can be curved. In these embodiments, the second edge 118 and the first edge 112 can generally form an acute angle, a right angle, or an obtuse angle. The body 106 can further include a third edge 120. In some embodiments, the third edge 120 can extend from the second edge 118 to the handle 104. As illustrated, the third edge 120 can be curved, or in other embodiments, the third edge 120 can be straight.

The first edge 112 can also have a second edge tip 116. In some embodiments, the angle formed by the first edge 112 and a fourth edge 124 can be an acute angle to permit each the second edge tip 116 to be pressed into an angled groove of a window frame. In some embodiments, the fourth edge 124 and the first edge 112 can be joined to form a right angle or an obtuse angle. Although illustrated as an angle, in some embodiments, second edge tip 116 can be curved. In these embodiments, the fourth edge 124 and the first edge 112 can generally form an acute angle, a right angle, or an obtuse angle. In yet other embodiments, one of the first edge tip 114 and the second edge tip 116 can be angled and the other edge tip can be curved. The body 106 can further include a fifth edge 126. In some embodiments, the fifth edge 126 can extend from the fourth edge 124 to the handle 104. As illustrated, the fifth edge 126 can be curved, or in other embodiments, the fifth edge 126 can be straight.

The first edge tip 114 and the second edge tip 116 can be fabricated to be separated by a length D 128. In some embodiments, the length D 128 can be five and three eights of an inch or within the threshold range of this value. The body 106 can have a first radius E 130 extending from a center point to the first edge 112. In some embodiments, the first radius E 130 can be three and eighty-one two hundred fifty sixths of an inch (e.g., 3 and 81/256 of an inch) or within the threshold range of this value. The body 106 can further include a second radius F 132. In some embodiments, the second radius F 132 can be two and three eighths of an inch (e.g., 2 and ⅜ of an inch) or within the threshold range of this value.

FIG. 2 is an illustration 200 of an example screen and spline tool, according to one or more embodiments. FIG. 2 presents the tool 102 from a different viewing angle than FIG. 1. The cylindrical shape of the handle 104 is illustrated in FIG. 2. Furthermore, it is illustrated, that the first edge 112, the first edge tip 114, the second edge tip 116, the second edge 118, the third edge 120, the fourth edge 124, and the fifth edge 126 can have a width that extends from the first body face 202 to the second body face 204. In some embodiments, the width is a uniform width. In other embodiments, each of the first edge 112, the first edge tip 114, the second edge tip 116, the second edge 118, the third edge 120, the fourth edge 124, and the fifth edge 126 can have a respective width. For example, the first edge 112 can have a length that extends from the first edge tip 114 to the second edge tip 116. In some embodiments, the width of the first edge 112 can be a uniform width from the first edge tip 114 to the second edge tip 116. To illustrate an example describing different widths, the respective widths of the third edge 120 and the fifth edge 126 can be different than the width of the first edge 112. As indicated above, the tool 102 can be fabricated for the first edge 112 to have a width configured to fit within the groove of a window frame.

For example, the body 106 can have a first body face 202 on one side and a second body face 204 on the opposite side. The first body face 202 and the second body space 204 can be spaced apart based on the edges, where the width of the faces can be based on a width of a groove of a window frame, as indicated above.

FIG. 3 is an illustration of an example cross-section of a screen and spline tool, according to one or more embodiments. As illustrated, the body 106 can be inserted into the handle 104. In some embodiments, a length G 302 of the body 104 can be inserted into the handle 106. In some embodiments, the length G 302 can be one half of an inch (e.g., ½ of an inch) or within the threshold range of this value. FIG. 3 illustrates the body 106 as having a first portion outside of the handle 104 that has a first thickness and a second portion inserted into the handle 104 that has a second thickness. It should be appreciated that in some embodiments, the body 106 can have a uniform thickness. The body 104 can include a channel 304 that includes a concave surface having a portion that recesses inward into the body 106. The recessed portion can be fabricated to have a desired radius. For example, in some embodiments, the recessed portion can have a radius of seven one hundred twenty eights of an inch (e.g., 7/128 of an inch), or within one sixteenth of an inch of seven one hundred twenty eights of an inch.

The recessed portion can have a surface profile that compliments a surface profile of a spline 306. For example, as illustrated, the spline 306 has a convex surface profile, whereas the recessed portion of the channel 304 has a concave surface profile. The complimentary surface profiles permit the channel 304 to securely hold the spline in place when pressed down upon. The complimentary profiles can also help prevent the channel 304 from sliding off of the spline 306 when pressed down upon. As indicated above, the conventional spline roller tools can be susceptible to rolling off of the spline. The herein described embodiments, can provide a channel 304 with a portion that has a surface profile that compliments the surface profile of the spline 306. It should be appreciated that as illustrated the spline 306 and the channel 304 have complimentary rounded surface profiles. One having ordinary skill in the art can contemplate other complimentary profiles. For example, both the spline 306 and the channel 304 can have a triangular surface profile, jagged surface profile or some other appropriate surface profile. A combination of the surface profile of the spline 306 and the channel 304 can help secure the spline 306 and prevent the channel 304 from moving off of the spline 306. Therefore, the tool 102 can be fabricated to have a channel 304 with a surface profile matching a spline surface profile.

Figure 4:
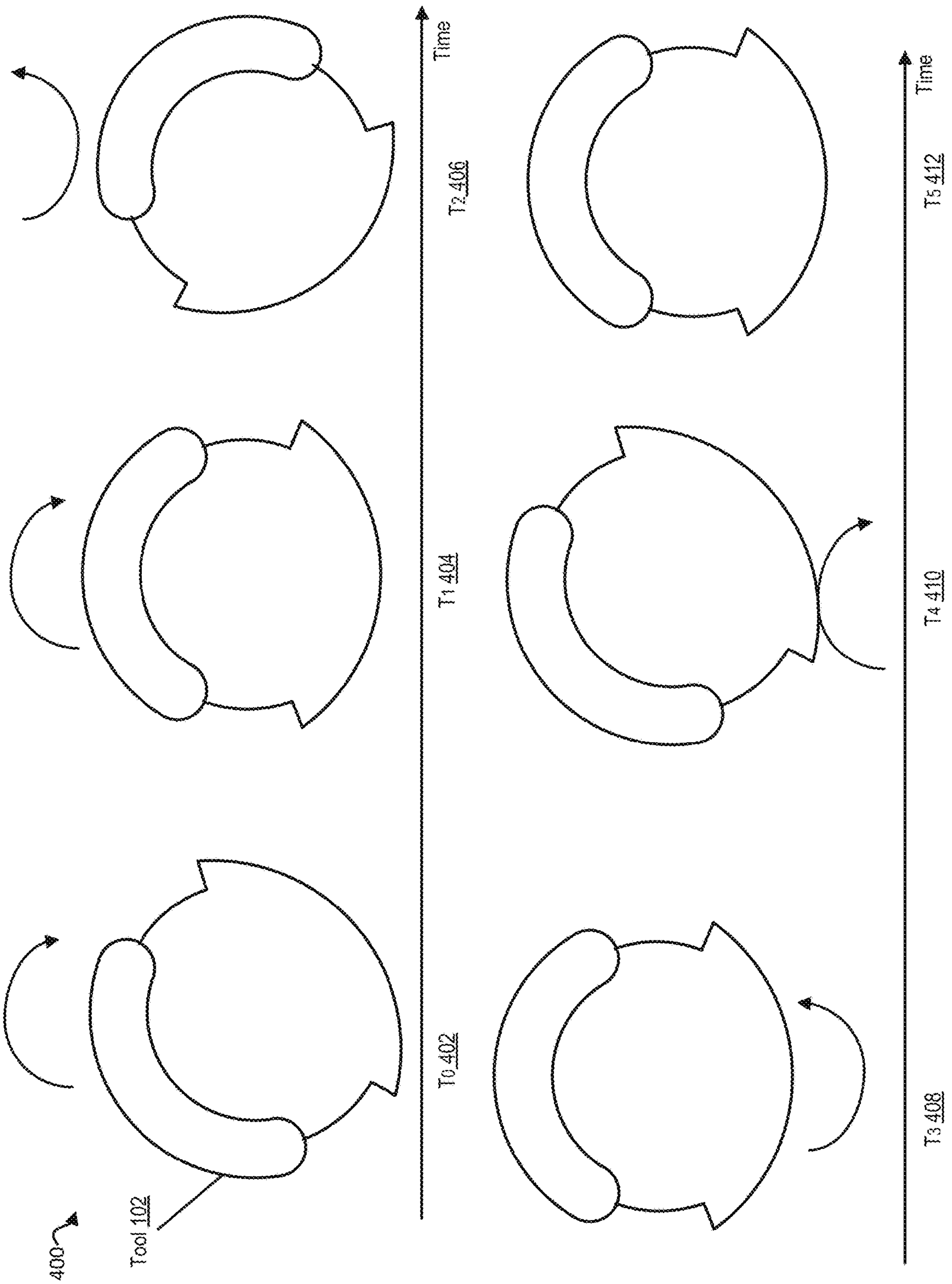
FIG. 4 is an illustration of a screen and spline tool rocking motion, according to one or more embodiments.
Figure 5:
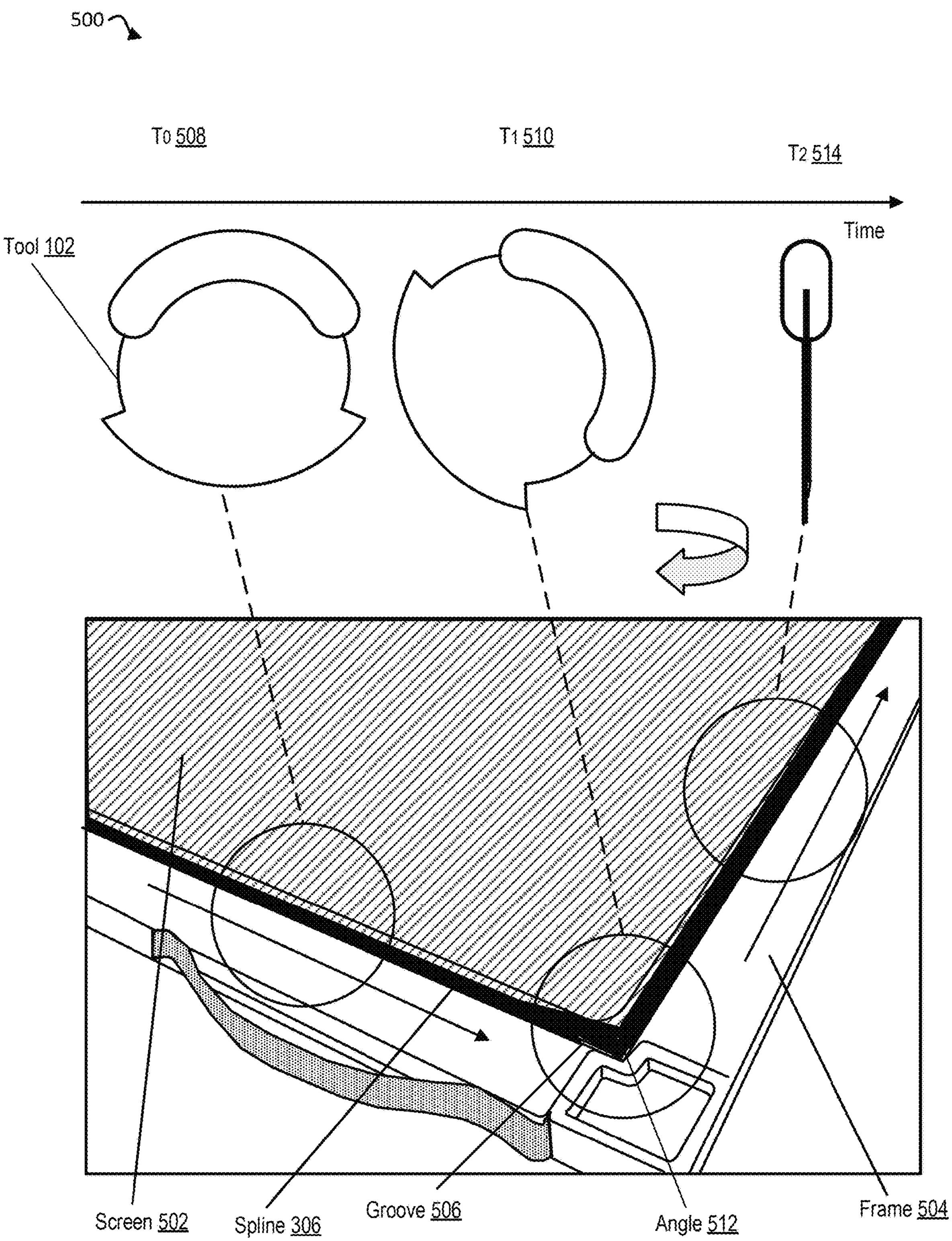
FIG. 5 is an illustration of an example screen and spline tool at a window frame angle, according to one or more embodiments.

FIGS. 4 and 5 are provided to illustrate use of the tool 102 for screen replacement.

FIG. 4 is an illustration of an example screen and spline tool rocking motion, according to one or more embodiments. As indicated above, the structure of the tool 102 permits a back and forth rocking motion to press a spline into the groove of a window frame. The spline can be arranged over a window screen to be pushed into the groove. The tool 102 is illustrated at different positions at different points in time.

At $T_0$ 402, the tool 102 can be in an initial position, and slightly rotated to the left of an upright position. The tool 102 can be pressed down on a spline to push the spline into a groove of a window frame. The tool 102 can be rotated in a clockwise motion. The rotation can be along a horizontal axis of the tool 102. As the tool 102 is rotated, the first edge 112 of the tool 102 can press down on the spline 306 causing more of the spline to be pressed into the groove and consequently securing more of the windrow screen onto the window frame.

At $T_1$ 404, the tool 102 can be in the upright position. The tool 102 can be further rotated in a clockwise motion. As the tool 102 is rotated, the first edge 112 of the tool 102 can press down on the spline 306 causing more of the spline to be pressed into the groove and consequently securing more of the windrow screen onto the window frame.

At $T_2$ 406, the tool can be in slightly rotated to right of the upright position. The tool 102 can be rotated in a counter-clockwise position, while sliding the tool 102 forward along the spline 306 to cause the first edge 112 to further press down and secure the window screen into the groove of the window frame.

At $T_3$ 408, the tool 102 can be in the upright position and be rotated in a counterclockwise motion. The tool 102 can further be slid forward over the spline 306 to cause the spline 306 to press the window screen down into the groove of the window frame.

At $T_4$ 410, the tool 102 can be slighting rotated to the left of the upright position, similar to the position at $T_0$ 402. The tool can be rotated in a clockwise motion causing the first edge 112 to push the spline 306 down over the window screen and into the groove of the window frame.

At $T_5$ 412, the tool 102 can be in the upright position and the rotating motion described above can continue for pushing the spline 306 down onto the window screen and into the groove of the window frame. The motion can continue until the spline 306 has been completely pushed down into the groove, or until an angle of the groove has been reached. FIG. 5 describes a motion to the tool 102 in the event an angle has been reached.

FIG. 5 is an illustration 500 of an example screen and spline tool at a window frame angle, according to one or more embodiments. As illustrated a screen 502 has been placed over a frame 504. A spline 306 is places on top of the screen 502 and over groove 506. A tool 102 can be used to push the spline 306 down causing the spline 502 and the screen 502 to be secured in the groove 506.

At $T_0$ 508, the tool 102 can push the spline 306 down into the groove 506 as described with respect to FIG. 4. At $T_1$, 510, an angle 512 of the groove 506 can be reached. As indicated above, the conventional spline roller tool may not be able to accommodate an angle, as a roller may not be able to turn an angle based on the dimensions of the groove. The herein described embodiments describe a tool with edge tips. At $T_1$ 501, the tool 102 can be rotated to cause an edge tip (e.g., first edge tip 114, second edge tip 116) to press down on the spline 306 at the angle 512. The edge tip can push the spline 306 down at the angle 512 to secure the screen 502 into the groove 506.

At $T_2$, 514, the tool 12 can be rotated over a vertical axis of the tool 102. The rotation can cause the first edge 112 of the tool 102 to be aligned with the groove 506 of the frame 504. The tool 102 can continue to be moved to cause the spline 306 to be pushed down over the screen 502 and into the groove 506. This process can continue until the spline 306 and the screen 502 are secured into the groove 506.

Figure 6:
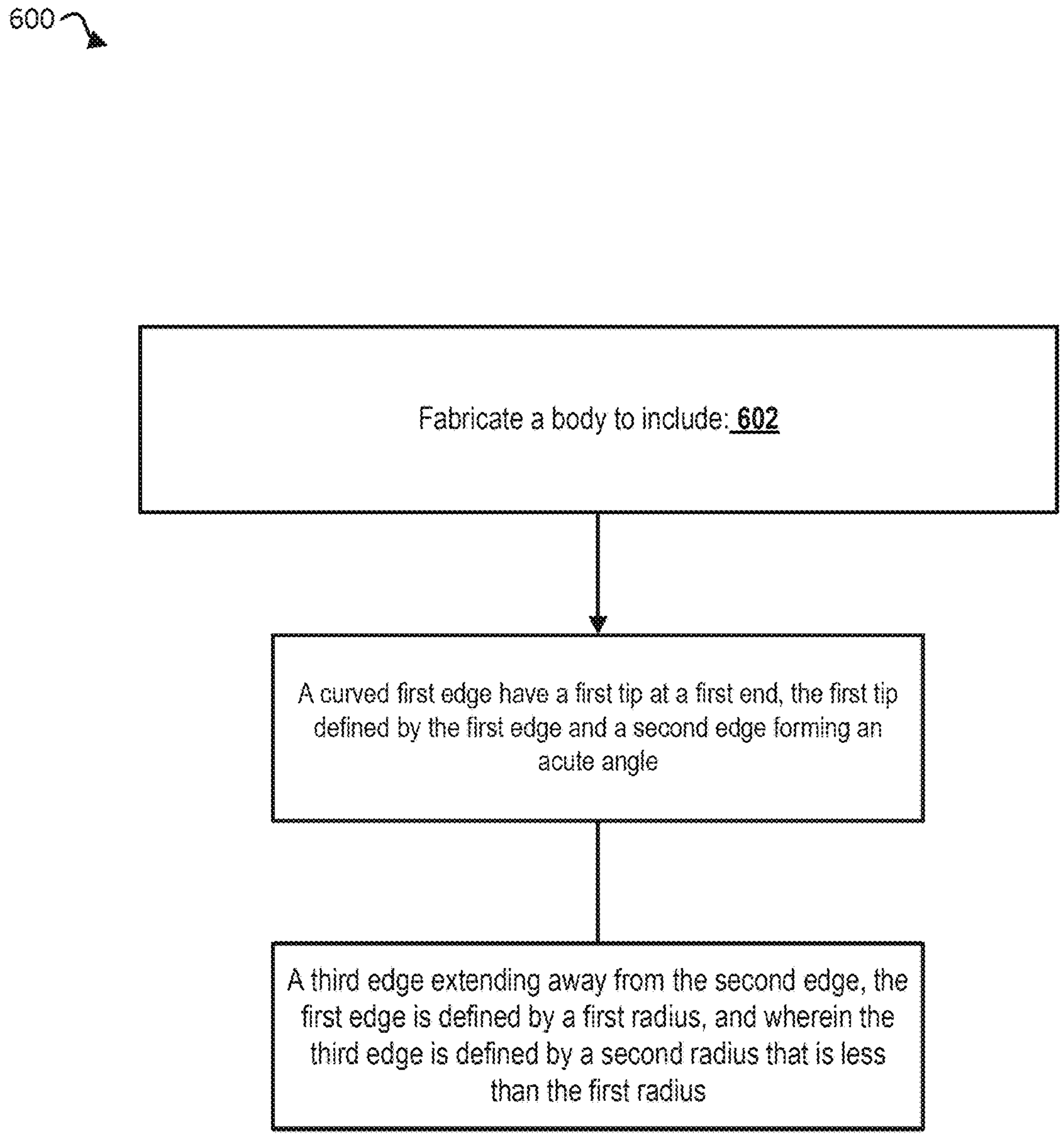
FIG. 6 is an example process for fabricating a screen and spline tool, according to one or more embodiments.

FIG. 6 is an example process 600 for fabricating a screen and spline tool (e.g., tool 102), according to one or more embodiments. At 602, the process 600 can include fabricating a body (e.g., body 106) to include a curved first edge (e.g., first edge 112) have a first tip (e.g., first tip 114) at a first end, the first tip defined by the first edge and a second edge (e.g., second edge 118) forming an acute angle. The body can further include a third edge (e.g., 120) extending away from the second edge, the first edge can be defined by a first radius (e.g., radius E 130), and the third edge can be defined by a second radius (e.g., second radius 132) that is less than the first radius.

The process 600 can further include determining a spline surface profile. For example, the process 600 can include determining whether a spline has a curved surface profile or a straight surface profile. The channel can be configured to compliment the spline surface profile. Therefore, the channel can be formed along the curved first edge to have a surface profile that compliments the spline surface profile.

The process 600 can further include fabricating a handle (e.g., 104) and connecting the handle to the body. The handle can be connected to the body at an opposite end than the first edge. In some embodiments, the body and the handle can be fabricated from the same material. In other embodiments, the body and the handle can be fabricated from different materials. In some embodiments, the body and the handle can be integrally fabricated. In other embodiments, the body and the handle can be fabricated separately and then connected to form the screen and spline tool.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A device for window screen replacement, the device comprising:
- a handle; and
- a body connected to the handle, the body comprising:
  - a curved first edge having a first tip at a first end, the first tip defined by the curved first edge and a second edge of the body, the curved first edge sized to fit in a groove of a window frame;
  - a third edge extending from the second edge to the handle;
  - a second tip at a second end of the body, the second tip defined by the curved first edge and a fourth edge; and
  - a fifth edge extending from the fourth edge to the handle,
- wherein the curved first edge comprises a channel extending inward into the body.

2. The device of claim 1, wherein the channel has a curved surface profile complimenting a spline surface profile.

3. The device of claim 1, wherein the channel has a straight surface profile complimenting a spline surface profile.

4. The device of claim 3, wherein the second tip is defined by the curved first edge and the fourth edge forming an acute angle, a right angle, or an obtuse angle.

5. The device of claim 1, wherein the curved first edge is defined by a first radius, and wherein the third edge is defined by a second radius that is less than the first radius.

6. The device of claim 1, wherein the handle has cylindrical structure, and wherein the body is partially inserted into the handle, wherein the handle is connected to the body at an opposite end than the curved first edge.

7. The device of claim 1, wherein the first tip is defined by the first edge and the second edge forming an acute angle, a right angle, or an obtuse angle.

8. The device of claim 1, wherein the third edge had a curved surface profile.

9. The device of claim 1, wherein the third edge has a straight surface profile.

10. The device of claim 1, wherein the body comprises a first flat face and a second flat face opposite the first flat face.

11. A device for window screen replacement, the device comprising:
- a body comprising:
  - a curved first edge having a first tip at a first end, the first tip defined by the curved first edge and a second edge of the body, the curved first edge sized to fit in a groove of a window frame;
  - a third edge extending from the second edge, the curved first edge defined by a first radius, and the third edge defined by a second radius that is less than the first radius; and
  - a second tip at a second end of the body, the second tip defined by the first edge and a fourth edge,
- wherein the curved first edge comprises a channel extending inward into the body.

12. The device of claim 11, wherein the first tip is defined by the curved first edge and the second edge forming an acute angle, a right angle, or an obtuse angle.

13. The device of claim 11, wherein the second tip is defined by the curved first edge and the fourth edge forming an acute angle, a right angle, or an obtuse angle.

14. The device of claim 11, wherein the device further comprises:
- a handle connected to the body.

15. The device of claim 11, wherein the first tip is defined by the curved first edge and the second edge forming an acute angle, and wherein the second tip is defined by the curved first edge and the fourth edge forming a right angle.

16. The device of claim 11, wherein the channel has a curved surface profile or a straight surface profile.

17. A method for fabricating a screen replacement tool, the method comprising:
- fabricating a body to include:
  - a curved first edge have a first tip at a first end, the first tip defined by the curved first edge and a second edge forming an acute angle; and a third edge extending away from the second edge, the curved first edge defined by a first radius, and the third edge defined by a second radius that is less than the first radius;

determining a spline surface profile, and forming a channel along the curved first edge to have a surface a profile that compliments the spline surface profile.

18. The method of claim 17, wherein the method further comprises:

fabricating a handle; and connecting the handle to the body.

* * * * *